United States Patent

[11] 3,628,701

| [72] | Inventor | Thomas L. Kissel |
| | | 606 South Rural St., Hartford, Wis. 53027 |
| [21] | Appl. No. | 859,451 |
| [22] | Filed | Sept. 19, 1969 |
| [45] | Patented | Dec. 21, 1971 |

[54] TAPPING APPARATUS FOR BEVERAGE KEGS
6 Claims, 1 Drawing Fig.

| [52] | U.S. Cl. | 222/400.7 |
| [51] | Int. Cl. | B65d 83/14 |
| [50] | Field of Search | 222/399, 400.7 |

[56] References Cited
UNITED STATES PATENTS

| 584,863 | 6/1897 | Farnoff et al. | 222/400.7 |
| 587,987 | 8/1897 | Mills | 222/400.7 |
| 3,076,484 | 2/1963 | Tennant | 222/400.7 X |

Primary Examiner—Robert B. Reeves
Assistant Examiner—Francis J. Bartuska
Attorneys—John W. Michael, Gerrit D. Foster, Bayard H. Michael, Paul R. Puerner, Joseph A. Gemignani, Andres O. Rireris and Daniel Van Dyke ABSTRACT: A tap for beverage kegs comprising a hollow plug which is inserted into the taphole of the keg, to thereby partially push the taphole stopper into the keg, the plug containing two external O-ring seals which provide a seal between the plug and the taphole and one internal O-ring seal provided above the gas inlet of the plug to thereby provide a seal between the tap rod and the plug as the rod is pushed through the plug to completely remove the stopper from the taphole. The internal O-ring also provides a seal for the gas which is supplied to the keg.

PATENTED DEC 21 1971    3,628,701
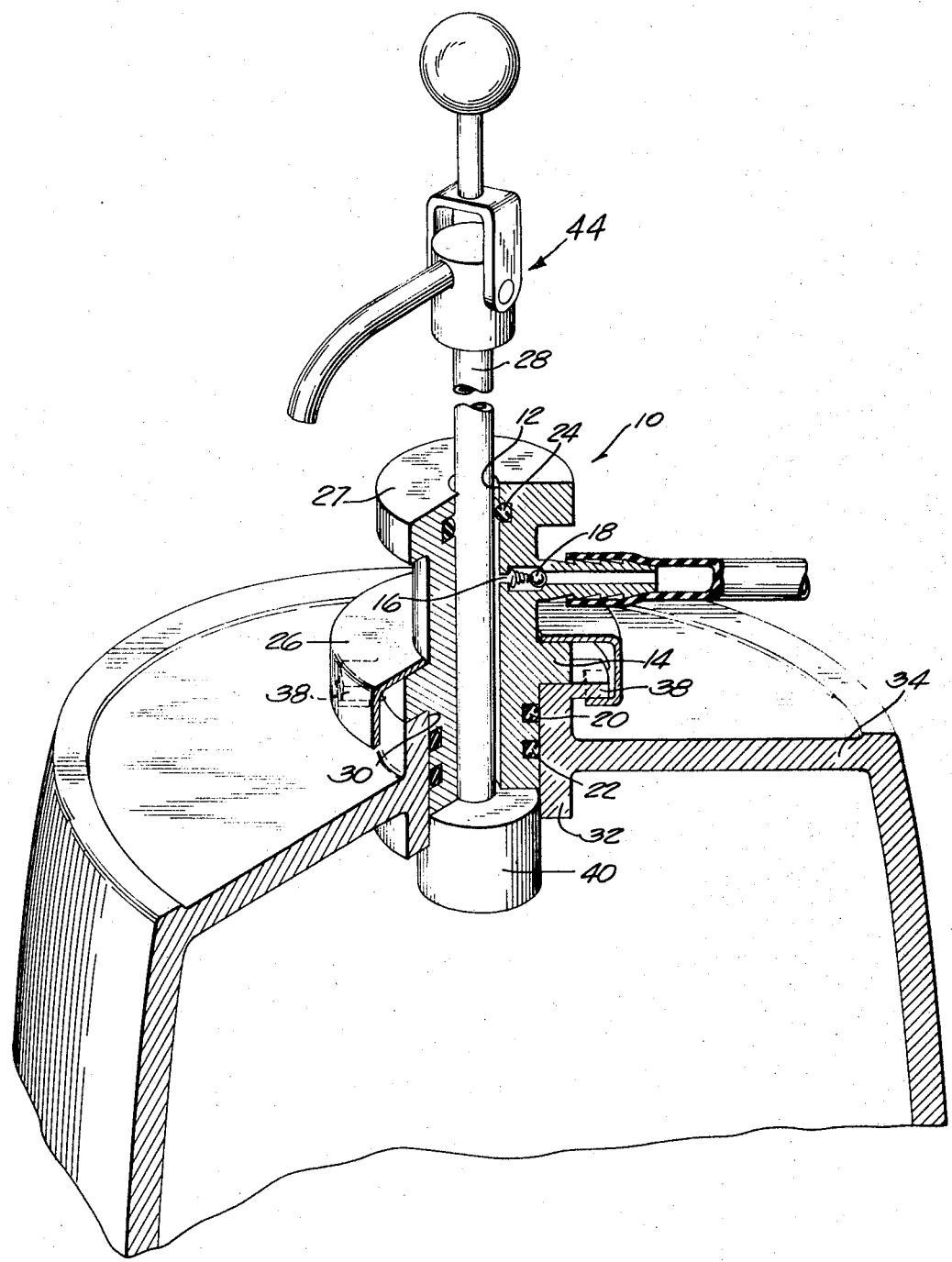
Inventor
Thomas L. Kissel
By Andrew O. Riteris
Attorney

TAPPING APPARATUS FOR BEVERAGE KEGS

BACKGROUND OF INVENTION

1. Field of Invention

The field of invention encompasses taps for beer and similar beverage kegs which contain liquid under some pressure.

2. Description of Prior Art

Tapping equipment used prior to the present invention had the widely known disadvantage of being susceptible to produce a sudden and substantial spray of liquid at the time of tapping. In prior commercially accepted equipment, a base clamp was first mounted on the outwardly extending flange surrounding the taphole. The clamp was tightened to provide a seal between the clamp and the flange. Thereafter, the stopper was pushed into the keg by a tap rod which projected through base clamp and through a fitting which was threadably mounted thereon. As the tap rod was pushed downwardly, the fitting was simultaneously tightened to provide a seal between the rod and the inside surface of the fitting as well as between the fitting and the base clamp. If the fitting was tightened too rapidly or had been excessively pretightened, the seal prevented effective downward movement of the rod. If the fitting was tightened too slowly, a sudden and substantial spray was created as the stopper left the taphole.

SUMMARY OF INVENTION

The principal object of the present invention is to provide tapping equipment which will not cause any escape of liquid during tapping of the keg.

Another and equally important object is to provide tapping equipment which will be less cumbersome, easier to operate and easier to fabricate than similar equipment used heretofore.

These objects are attained by providing a centrally apertured plug which is pushed into the taphole to partially push the stopper into the keg. The plug has two external O-ring seals which provide a seal between the taphole and the plug. An internal O-ring seal is located in the central aperture and provides a seal between the inside surface of the aperture and the tap rod as it is inserted into the plug and is pushed downwardly against the stopper. The clearance between the tap rod and the aperture is fairly small, and as the stopper is removed the upward flow of the beverage and released gases is restricted to the narrow passage between the tap rod and aperture sidewall. For this reason, the O-ring seal is sufficient to prevent any beverage spray or leakage, which was encountered with prior commercial taps. The passage is, however, ample to permit a flow of gas under pressure from an entry port below the internal sealing means to the keg to, thus, permit the beverage to be maintained under sufficient pressure for operation of the tap.

DESCRIPTION OF THE DRAWING

The drawing is a perspective side view of the tapping equipment embodying the present invention with portions broken away and with the equipment shown in a condition after the tapping plug has been inserted in the taphole of a keg and at a time when the tap rod is in a position to be pushed downwardly against the stopper to fully remove it from the taphole.

DESCRIPTION OF PREFERRED EMBODIMENT

The equipment embodying the present invention is essentially comprised of a hollow round plug 10 having a central aperture 12, a centrally located outwardly extending flange 14 and a round side aperture 16 containing a check valve 18. Two O-ring seals 20 and 22 are retained in appropriate external grooves on the outside of the plug below the flange 14 and another O-ring seal 24 is retained in an internal groove within aperture 12 at a location above the side aperture 16. A bayonet coupling member 26 is rotatably mounted on the outside of the plug just above the flange 14. A second outwardly extending flange 27 is provided at the top of the plug and provides a wider gripping surface for the plug. The central aperture 12 is adapted to receive the tap rod 28 and the side aperture is adapted to be connected to a source of gas under pressure.

The function of the equipment can be best understood by description of the tapping process in reference to the drawing. The keg, as it is supplied by the brewery or other processor, is provided with a taphole 30 usually located at the center of one of the ends of the keg. The taphole is defined by a bushing 32 which extends partially above the keg end wall 34 and which is radially outwardly extending ears 38. The latter permit a bayonet type of coupling member to be secured to the bushing. When the keg is supplied, the top of the stopper 40 is flush with the top of bushing 32.

The first step in tapping is to push the plug 10 into the taphole until the flange 14 meets the top surface of the bushing. Since the distance between the lower end of the plug and the bottom surface of flange 14 is less than the depth of bushing 32, usually a standard dimension, the stopper is only partially pushed into the keg. Thereafter, the coupling member 26 is rotated to engage the lower faces of the ears 38 and, thus, secure the plug to the keg.

Thereafter, the tap rod 28 is inserted into aperture 12 until it rests on the top surface of the stopper. As it moves past the O-ring 24, a seal is established between the O-ring and the tap rod. As the tap rod is moved further, the stopper is completely pushed out from the taphole and the beverage, which at the time is under some pressure, is free to travel upwardly through the hollow tap rod where its further travel is controlled by the tap valve 44, a known manner.

The beverage and/or gases will also tend to travel in the narrow space between the tap rod and inside sidewall of the aperture 12; however, escape will be blocked by the O-ring 24. After the initial pressure within the keg is dissipated by drawing of some beverage, further gas under pressure is supplied through aperture 16. The gas travels into the keg through the space between the tap rod and aperture 12. Its escape will, of course, also be blocked by O-ring 24.

The check valve 18 permits inward fluid travel; however, it blocks fluid travel in the reverse direction and, thus, is able to avoid beverage contamination in the event of a pressure drop at the source of the gas.

The illustrated plug contains two external O-ring seals primarily for the purpose of avoiding leakage in the event that some scouring of the taphole at one location might be so severe as to prevent the establishment of a proper seal. Thus, the second O-ring might be considered as insurance in cases where the plug is used on slightly damaged kegs. It also should be noted that the particular design of the check valve 18 and of the attachment to the gas supply hose are standard components and that the selection of any particular check valve or hose connection may be a matter of choice and should not affect the function of the disclosed tapping mechanism.

I claim:

1. Apparatus for tapping a beverage keg comprising a plug which may be inserted into the taphole of the keg to partially push the stopper into the keg, said plug having a central longitudinally extending aperture which permits a tap rod to be inserted through said plug so that the tap rod rests against the face of the stopper and so that upon further movement of the tap rod the stopper may be pushed out from the taphole, said plug containing external sealing means which comes into contact and establishes a seal with the inside surface of the taphole as the plug is inserted therein and internal sealing means contained in said central aperture which comes into contact and establishes a seal with the tap rod as it is moved into said aperture; and said plug having radially outwardly extending stop means located above said external sealing means (when the plug is viewed as in a position for tapping a vertically extending taphole) and being removed from the bottom end of said plug by a distance less than the depth of the taphole to be tapped, said stop means being adapted to seat on the keg adjacent the taphole and to, thus, prevent further downward movement of said plug.

2. Apparatus according to claim 1, wherein said internal sealing means is comprised of resilient O-ring means.

3. Apparatus according to claim 2, wherein said internal sealing means is located above the bottom surface of said stop means and wherein said plug contains a radially extending aperture located between said internal sealing means and the bottom surface of said stop means to thereby provide an access for supply of gas under pressure to the keg, such gas being free to flow in the space between the tap rod and the inside wall of said central aperture and being sealed from upward flow by said internal sealing means.

4. Apparatus according to claim 3, wherein said external sealing means is comprised of resilient O-ring means.

5. Apparatus according to claim 4, including connector means for connecting said plug to the keg for restraining outward movement of said plug from the taphole.

6. Apparatus according to claim 4, including check valve means associated with said radially extending aperture, said check valve means permitting radially inward fluid flow and blocking radially outward fluid flow.

* * * * *